Figure 4:
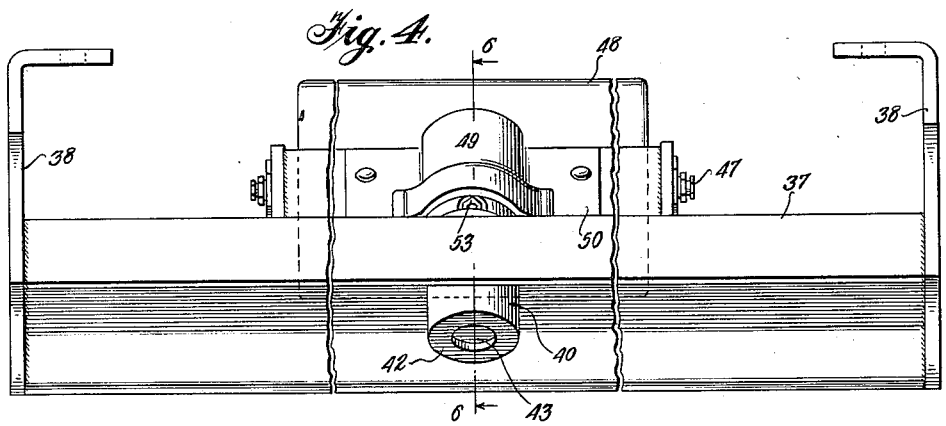

Dec. 17, 1940.   R. W. PARKER   2,225,276
SELF-ALIGNING IDLER FOR BELT CONVEYERS
Filed Oct. 7, 1938   5 Sheets-Sheet 1
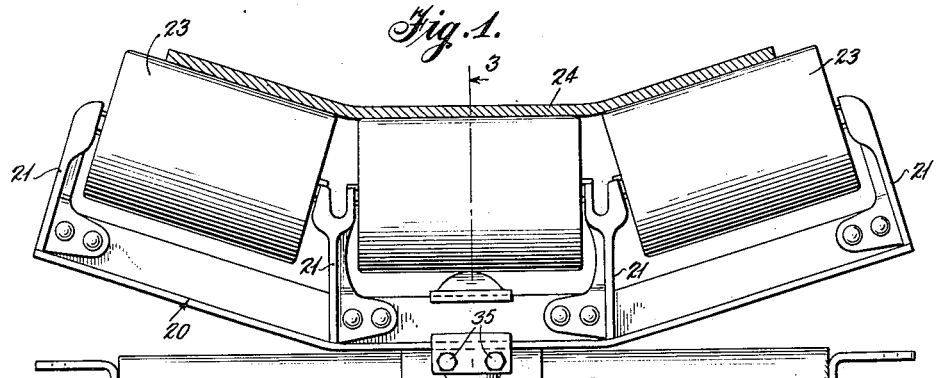
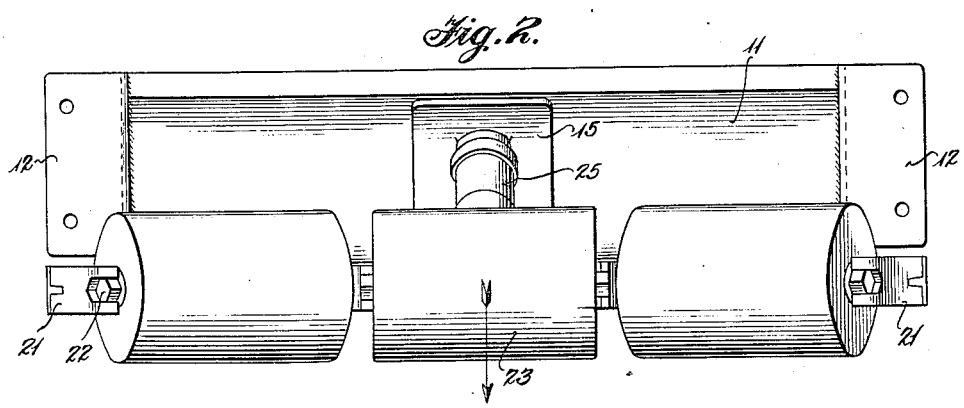
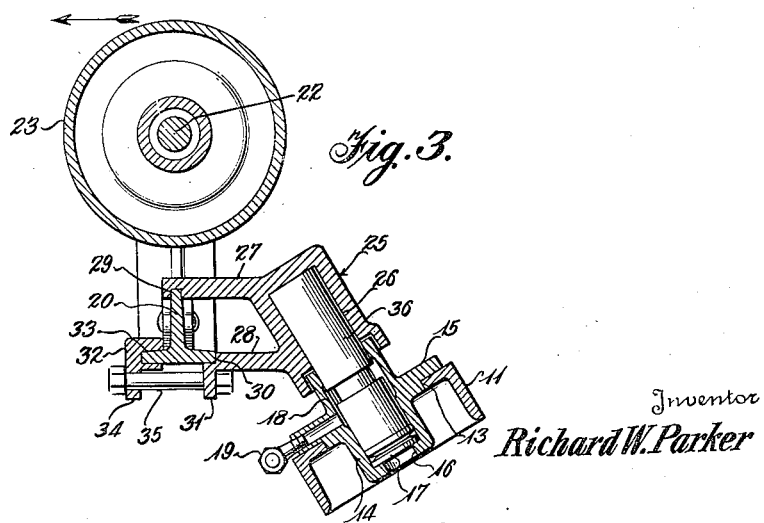
Inventor
Richard W. Parker
By L. Donald Myers
Attorney Dec. 17, 1940.   R. W. PARKER   2,225,276
SELF-ALIGNING IDLER FOR BELT CONVEYERS
Filed Oct. 7, 1938   5 Sheets-Sheet 2

Inventor
Richard W. Parker
By L. Donald Myers
Attorney

Dec. 17, 1940.  R. W. PARKER  2,225,276
SELF-ALIGNING IDLER FOR BELT CONVEYERS
Filed Oct. 7, 1938  5 Sheets-Sheet 3
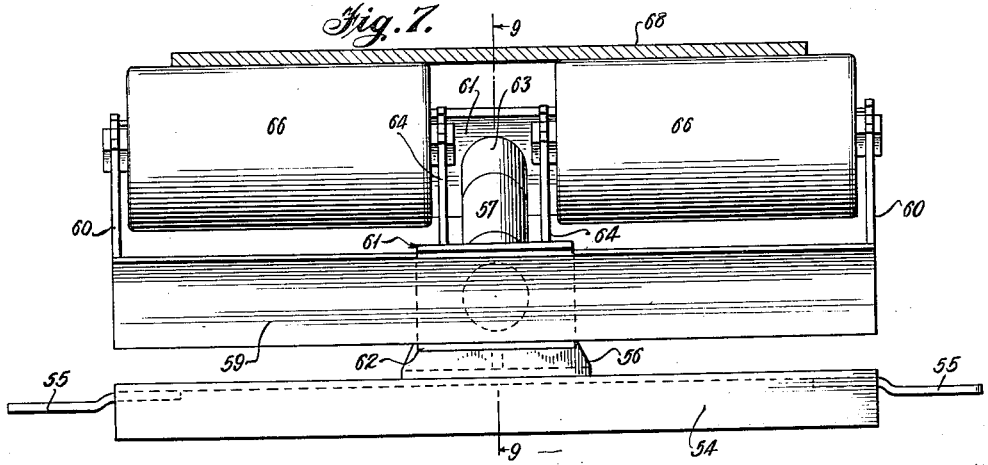
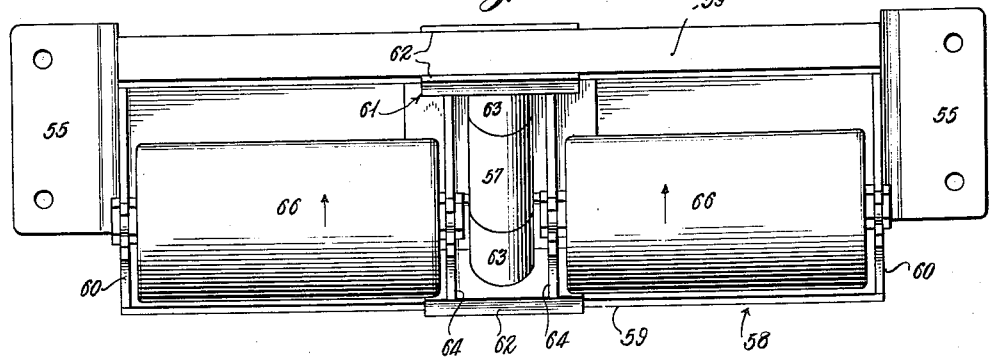
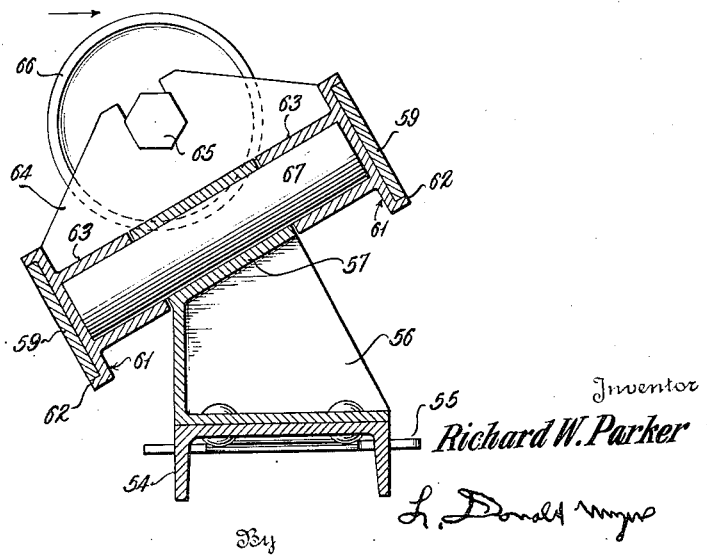
Inventor
Richard W. Parker

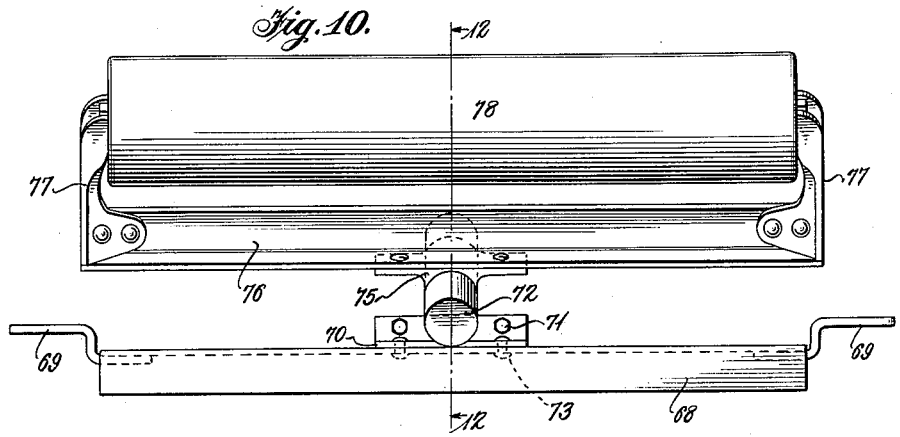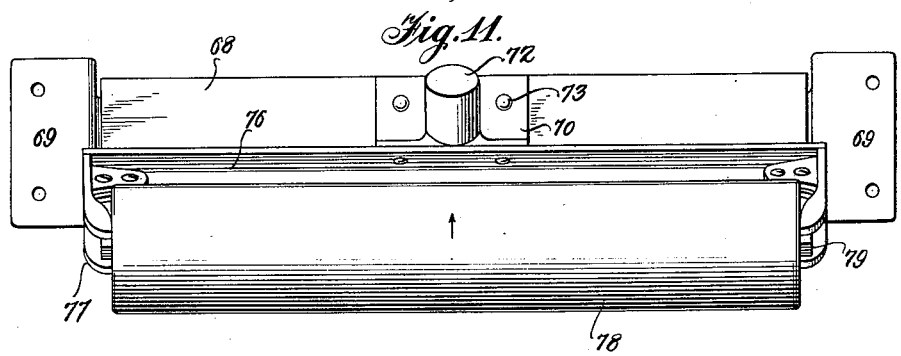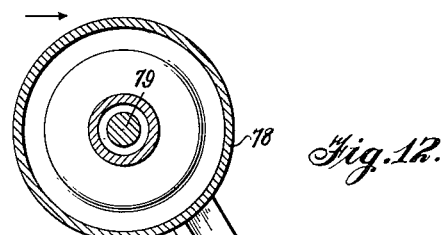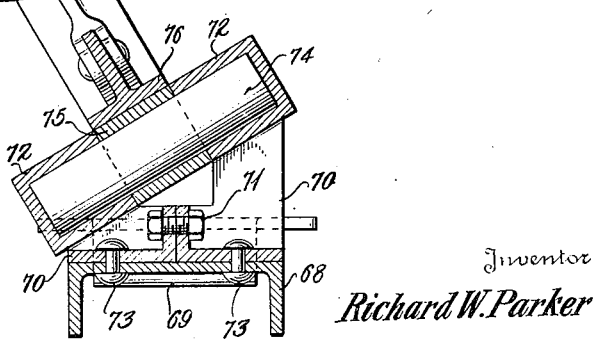

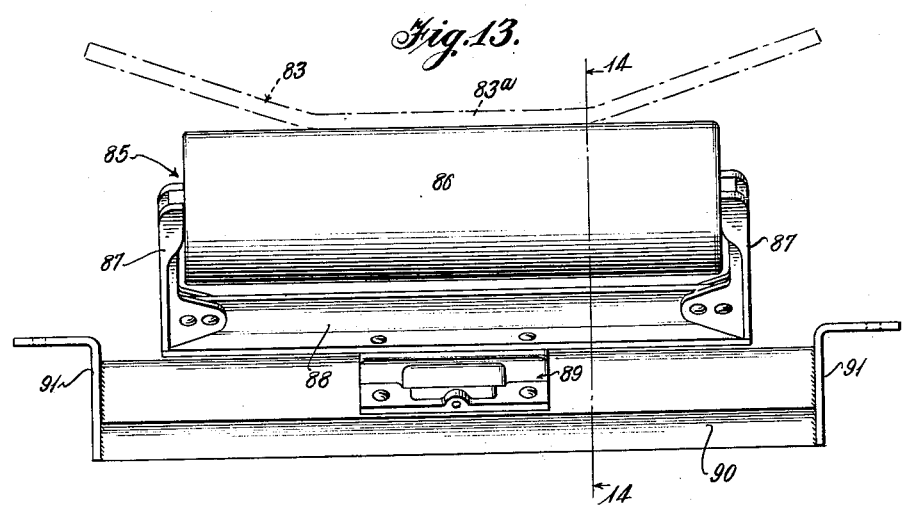
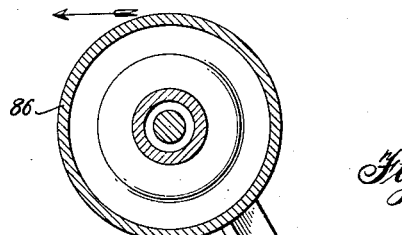
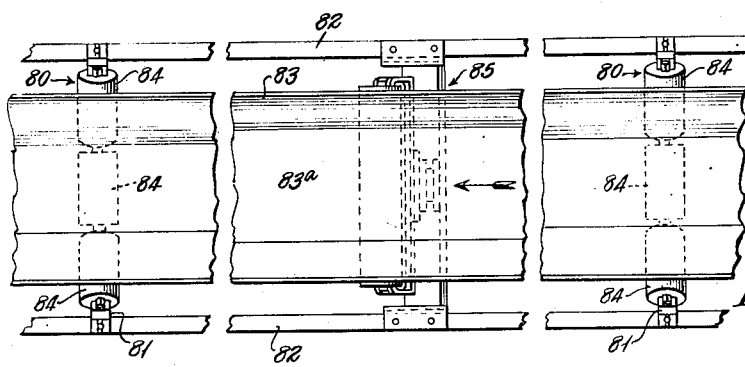

Patented Dec. 17, 1940

2,225,276

UNITED STATES PATENT OFFICE 2,225,276

SELF-ALIGNING IDLER FOR BELT CONVEYERS

Richard W. Parker, Indianapolis, Ind., assignor to Link-Belt Company, a corporation of Illinois Application October 7, 1938, Serial No. 233,847

15 Claims. (Cl. 198—202)

This invention relates to new and useful improvements in self-aligning idlers for belt conveyers.

It is extremely difficult to maintain the belts of belt conveyers running in proper alignment with respect to the fixed carrying idlers employed for supporting the active and inactive runs of the belt. Such misalignment, of course, may result from any one or more of several different causes such as: improper transverse loading of the belt, improper alignment of the several fixed carrying idlers, uneven longitudinal stretching and shrinking of the opposite edge portions of belts carrying wet loads, such as sand and gravel, due to uneven transverse drying during inactive periods, and the like. This problem of alignment is encountered with both flat and troughed belt conveyers and with both the active and inactive runs of the same.

It is the present practice to employ some form of mechanism which will operate automatically, in response to misalignment of a belt, to train the belt back into a normal transverse position. Most of such devices consist of self-aligning idlers substituted for certain of the fixed carrying idlers of a belt conveyer. Each of these self-aligning idlers includes an idler frame supported for rotating or swiveling movement about the axis of a vertically arranged gudgeon. Movement of the idler frame to effect training of the belt is accomplished by means of some force developing instrumentality which is added to and operatively associated with the idler frame or the roll or rolls carried thereby. These instrumentalities usually take the form of small guiding or actuating rolls against which the belt edges bear and with the said rolls arranged relative to the idler frame so that engagement of one of the rolls by an edge of a misaligned belt will cause the idler frame to move to train the belt back into its proper position; brake shoes which drag on the belt or idler rolls and thereby cause proper swinging movement of the idler frame, or counterweighted members rotatably carried by the idler frame and functioning to develop inertia when they are rotated as a result of engagement with the belt. Such self-aligning idlers naturally cost more than the conventional fixed carrying idlers and usually require more space to accommodate the force developing instrumentality.

It is the primary object of this invention to provide self-aligning idlers for belt conveyers, of both the flat and troughed belt type and for both the active and inactive runs of the belt, whose construction is much simpler, more compact, and less expensive than the self-aligning idlers now in common use.

A further important object of the invention is to provide self-aligning idlers which possess the aforementioned advantages primarily because of the fact that they do not require the addition of force developing instrumentalities to the rotatable idler frames to bring about the desired belt training movement of the frames.

A still further object of the invention is to provide a self-aligning idler of the rotatable frame type in which the frame is supported for movement in such a manner that misalignment of a belt relative thereto will produce an unbalanced weight condition which will supply the force required to effect the necessary belt training movement of the idler frame.

Another object of the invention is to provide a self-aligning idler in which the various elements are so arranged as to reduce the overall depth of the idler, which in many installations is a great advantage.

Still another object of the invention is to provide an idler for troughed belts which is more effective for training the belts back to their proper transverse position than are self-aligning idlers of the type employing a plurality of rolls which are relatively arranged to also effect troughing of the belts.

Another object of the invention is to provide a self-aligning idler for either troughed or flat belts which will not damage the belt edge as a result of contact with a force developing instrumentality.

Other objects and advantages of the invention will be apparent during the course of the following description.

Figure 5:
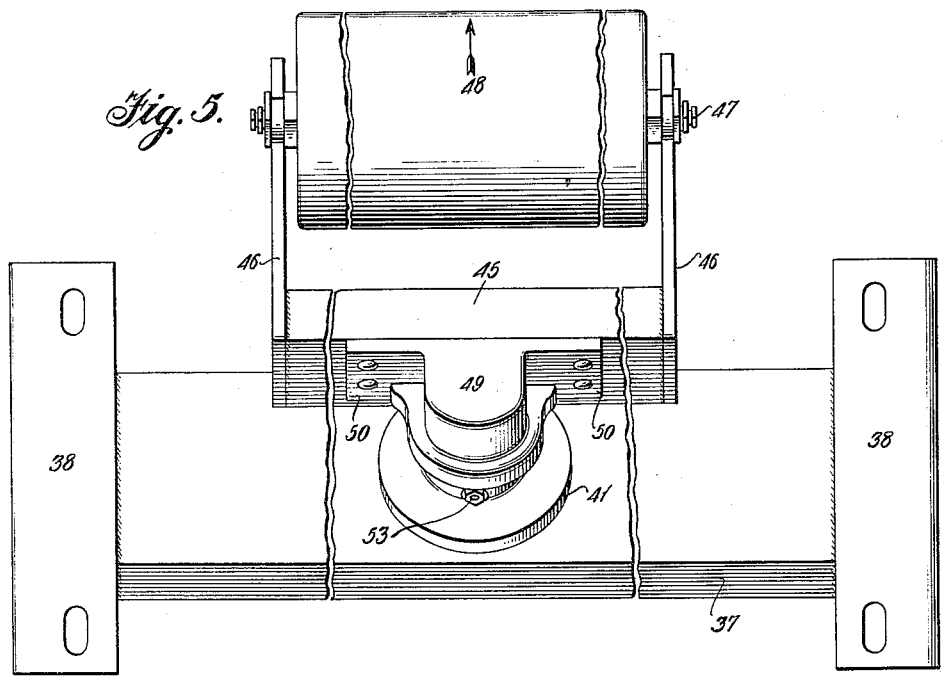
Figure 6:
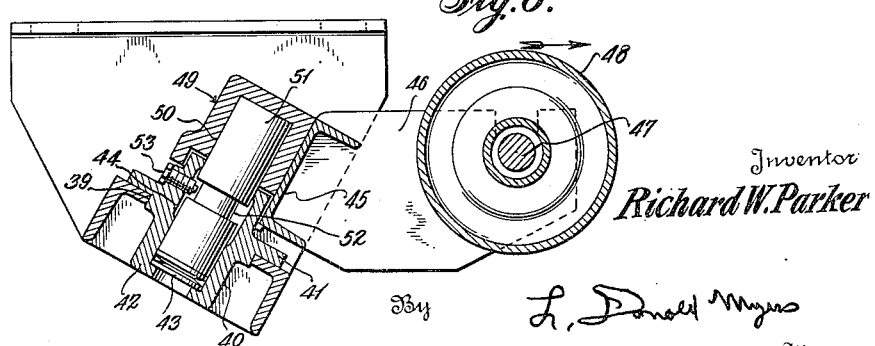

In the accompanying drawings forming a part of this specification and in which like numerals are employed to designate like parts throughout the same, Figure 1 is an elevational view of one form of self-aligning idler embodying this invention, Figure 2 is a top plan view of the idler disclosed in Fig. 1, Figure 3 is a vertical sectional view taken on line 3—3 of Fig. 1, Figure 4 is an elevational view, partly broken away, of a modified form of self-aligning idler embodying this invention, Figure 5 is a plan view of the idler structure disclosed in Fig. 4, Figure 6 is a vertical sectional view taken on line 6—6 of Fig. 4, Figure 7 is an elevational view of a further modified form of self-aligning idler embodying this invention, Figure 8 is a top plan view of the idler structure disclosed in Fig. 7, Figure 9 is a vertical sectional view taken on line 9—9 of Fig. 7, Figure 10 is an elevational view of a still further modified form of self-aligning idler embodying this invention, Figure 11 is a top plan view of the self-aligning idler structure disclosed in Fig. 10, Figure 12 is a vertical sectional view taken on line 12—12 of Fig. 10, Figure 13 is an elevational view of a still further modified form of self-aligning idler which embodies the principle of training the troughed carrying run of a conveyer belt by means of a flat idler roll, Figure 14 is a vertical sectional view taken on line 14—14 of Fig. 13, and Figure 15 is a fragmentary top plan view of a belt conveyer structure illustrating two fixed troughing idlers with a flat self-aligning idler interposed therebetween.

In the drawings, wherein for the purpose of illustration are shown the preferred embodiments of this invention, and particularly referring to Figs. 1 to 3, inclusive, there is disclosed a self-aligning idler structure for belt conveyers of the type which will trough the belt and which may be employed in place of one of the usual fixed carrying idlers for supporting the belt. This idler structure consists of a channel base 11 to the opposite ends of which are welded the angular attaching brackets 12 by means of which the base is secured to stringers forming part of the belt idler supports, not shown. The several figures disclose the attaching brackets 12 as being shaped and attached to the ends of the channel base 11 in such a manner as to support the base with its top surface transversely inclined.

The channel base 11, as is best illustrated in Fig. 3, is centrally apertured at 13 to receive a swivel housing 14, the main body of which is of hollow or tubular formation and has secured thereto the laterally projecting mounting flange 15. This swivel housing 14 is suitably secured to the channel base 11; such as by riveting, brazing, welding, or the like. The lower end of the swivel housing 14 is flanged inwardly at 16 to form a seat for the hardened thrust buttons 17. A portion of the bore of the bearing part of the housing is enlarged, as at 18, for forming a lubricant space which is packed with lubricant through the grease fitting 19.

A T shaped idler frame 20, of troughing shape longitudinally, is provided with suitably spaced, upstanding arms 21 for receiving the shafts 22 which mount the idler rolls 23 on said arms. These various rolls are so arranged, as clearly illustrated in Fig. 1, as to effect troughing of the conveyer belt 24.

Figs. 1 and 3 clearly illustrate the central portion of the idler frame 20 as having attached thereto a swivel apron 25. This swivel apron includes the pocket portion 26 which has integrally formed therewith the laterally projecting arms 27 and 28. The arm 27 has formed in its outer end portion a seat channel or groove 29 which receives one flange of the T frame 20. The arm 28 has a seat 30 formed therein for receiving another flange of T frame 20. This arm also has formed thereon a lug 31. A separate clamping lug 32 is shaped to provide a seat 33, for receiving the remaining flange of the T frame 20, and an ear 34 which receives the bolts 35 that additionally pass through the lug 31 of the arm 28. By means of these bolts 35, the lug 32 may be drawn toward the arm 28 for cooperating with this arm and the arm 27 to detachably clamp the idler frame 20 to the swivel apron 25.

The socket portion 26 of the swivel apron 25 has suitably secured therein a gudgeon 36. This gudgeon is of sufficient length to be received within the bore of the swivel housing 14. This gudgeon, therefore, rotatably connects the idler frame 20 to the channel base 11. Due to the inclined arrangement of this channel base and the manner in which the swivel housing 14 is mounted in the base, the gudgeon 36 is arranged with its axis inclined. The axis of the gudgeon should be inclined at an angle of from 20° to 50° to obtain the best results.

By inspecting the various figures, and particularly Fig. 3, it will be seen that the idler frame 20 and its idler rolls 23 will be permitted to swing about the inclined axis of the gudgeon 36. Due to the provision of the laterally projecting arms 27 and 28, the frame 20 will be supported in a laterally offset position with respect to the gudgeon axis. When the frame 20 and its rolls are arranged in their normal position, the common vertical plane which passes through the shafts 22 of the several rolls and the center of the idler frame 20 will be arranged truly transversely of the belt 24 and normal to the plane of travel of the belt. As a projection of the axis of the gudgeon 36 passes to one side of the shaft 22 which supports the center idler roll 23, the entire frame and its rolls will travel in an arcuate path or will caster about the inclined axis of the gudgeon.

When the belt 24 is properly aligned with the idler frame 20 and its rolls 23, the weight of the belt and its load will be balanced with respect to the width of the idler frame. Should the belt 24 become misaligned with respect to the idler frame, an unbalanced weight condition will be present and the heavy side of the belt will result in causing the idler frame 20 and its rolls to caster about the gudgeon axis; i. e., the over-balanced side of the idler frame and rolls will dip downwardly and forwardly while the remaining side of the frame and rolls will move upwardly and rearwardly. The two halves of the idler frame and rolls, therefore, will partake of both vertical and horizontal movements. The downward and forward movement of the over-balanced side of the idler frame and rolls will result in training the belt 24 back into its properly aligned position with respect to the width of the idler frame. As a perfectly balanced condition then will exist, the idler frame will swing back into its normal position.

In Figs. 4 to 6, inclusive, there is disclosed a type of self-aligning idler which is especially adapted for use as a training device for the return or inactive run of a conveyer belt.

This return run idler consists of a channel base 37 to the opposite ends of which are welded the angular attaching brackets 38. These brackets are employed for attaching the self-aligning idler to stringers of a belt conveyer frame, not shown. Due to the shape of the attaching brackets 38 and the manner in which they are fastened to the channel base 37, the said base is supported with its top surface transversely inclined.

The channel base 37 is centrally apertured at 39 to receive the swivel housing 40 which is provided with a laterally projecting flange 41 by means of which the housing is secured to the channel base. The lower end of the main body of the swivel housing, which body is of tubular formation, is flanged at 42 to form a seat for the hardened thrust buttons 43. The bore of the main body of the swivel housing is enlarged at 44 to form a lubricant receiving space. A suitable grease fitting, see Fig. 3, may be provided for supplying this space with suitable lubricant.

An idler frame is formed by the channel member 45. Bracket arms 46 are welded to the opposite ends of the channel frame 45 and function to support the shaft 47 for the idler roll 48.

A swivel apron 49 is provided with attaching ears 50 which are riveted to the channel idler frame 45. This swivel apron 49 is provided with a socket 50 for receiving a gudgeon 51 which is of proper length to be received within the bore of the swivel housing 40. This gudgeon is provided with a peripheral groove 52 to receive the inner end of a set screw 53 which functions to retain the gudgeon against unintentional withdrawal from the bore of the swivel housing 40.

By inspecting the various figures, and particularly Fig. 6, it will be seen that the gudgeon 51 is supported with its axis inclined. Due to the particular construction and arrangement of the swivel apron 49, the idler frame 45, and the bracket arms 46, the idler roll 48 is supported in a laterally offset position with respect to the gudgeon 51. When the idler frame 45 and its roll 48 move about the axis of the gudgeon, the roll will partake of the movements of a caster wheel. This caster movement will be modified by the inclination of the gudgeon axis to cause the roll 48 to travel through an inclined path or plane which will intersect the plane of the conveyer belt which rests upon the periphery of the roll.

This idler will function in the same manner as the idler disclosed in Figs. 1 to 3, inclusive; i. e., when the return run of the belt conveyer becomes misaligned or moves to one side or the other of its normal path, the unbalanced weight of the belt will cause the idler frame 45 and its roll 48 to swing in an inclined path around the axis of the gudgeon 51. One side of the roll 48, therefore, will dip downwardly and forwardly while the other side will move upwardly and rearwardly. This movement of the idler roll will retrain the belt into its normal transverse position.

Referring now specifically to the idler structure disclosed in Figs. 7 to 9, inclusive, which is intended for use in training load carrying runs of flat belts or return or inactive runs of either flat or troughed belts, the reference character 54 designates a channel base to the opposite ends of which attaching brackets 55 are welded. These brackets are employed to attach the base to the stringers of a belt conveyer frame, not shown. It will be noted that the channel base 54 is supported in a different manner than the channel bases of the previously described structures. This channel base is arranged with its top surface extending truly horizontally. Riveted to the center of the channel base is a bearing bracket 56 provided with the bearing sleeve 57 at its upper end. Fig. 9 clearly discloses the fact that the axis of this bearing sleeve 57 is inclined.

A rectangular shaped idler frame 58 is provided and is formed of longitudinally extending side bars 59 which are interconnected at their opposite ends by means of end brackets 60. These end brackets are suitably welded to the side bars 59. At the central portion of the idler frame 58, there are arranged two bearing brackets 61.

These brackets have channel end portions 62 for receiving the frame bars 59 and bearing sockets or sleeves 63 which are spaced at their adjacent ends and are arranged in axial alignment with each other. For the purpose of retaining the two bearing brackets 61 in their desired spaced, aligned positions, bracket arms 64 are provided and are arranged as is best illustrated in Figs. 8 and 9. The four brackets 60 and 64 may be considered as being arranged in two pairs with each pair functioning to support the shaft 65 of an idler roll 66. These two idler rolls 66, therefore, are spaced at their adjacent ends to accommodate the bracket members 64 and the bearing sleeves 63.

A gudgeon 67 is received within the bearing sleeves 57 and 63 for pivotally connecting the idler frame and its rolls to the bracket 56. As is clearly illustrated in Fig. 9, the axis of the gudgeon 67 is inclined. Due to the provision of the two rolls 66 which are axially spaced and the arrangement of the bearing sleeves 63 in the space between these two rolls, the overall height of the entire self-aligning idler structure is reduced.

Fig. 7 discloses a flat load carrying belt or a return or inactive run of a belt 68 resting on the roll 66. Due to the positioning of the roll shaft 65 above the gudgeon 67 and radially or laterally of the gudgeon axis, the roll axes will be permitted to move in an arc or a plane which is inclined or arranged at right angles to the axis of the gudgeon and positioned to intersect the gudgeon between its ends. When the belt 68 moves out of proper alignment with respect to this self-aligning idler structure, the idler frame 58 and its rolls 66 become unbalanced and are caused to swivel about the axis of the gudgeon. One of the rolls 66 and the cooperating portion of the idler frame will dip downwardly and forwardly while the remaining roll and its portion of the idler frame will move upwardly and rearwardly. Due to the positioning of the rolls 66 above the gudgeon and between the ends of the same, the load imposed upon the rolls by the belt and its load will be applied radially to the bearing sleeves 57 and 63.

The form of self-aligning idler disclosed in Figs. 10 to 12, inclusive, which is intended for use in training active or carrying runs, includes a channel base 68 to the opposite ends of which are welded the attaching brackets 69. These attaching brackets are intended to mount the idler upon the stringers of a belt conveyer frame, not shown. The attaching brackets support the channel base 68 in a truly horizontally extending position.

A pair of bearing brackets 70 is provided and is interconnected by the securing elements 71 which may take the form of bolts and nuts. These elements interconnect the two bearing brackets 70 so that their bearing sleeves or sockets 72 will be arranged in spaced, axial alignment. To fasten the bearing brackets to the center of the top of the channel base 68, rivets 73 are employed. It will be noted that the aligned bearing cups or sleeves 72 have their common axis inclined. A gudgeon 74 is mounted in the bearing openings of the sleeves 72 and has attached to the portion of the same arranged between the bearing sleeves 72 a bearing bracket 75 which is attached to the middle portion of a T shaped idler frame 76.

This idler frame has attached to the same the upstanding arms 77 which function to rotatably support the idler roll 78 by means of its shaft 79.

Fig. 12 clearly discloses the fact that the gudgeon 74 is supported with its axis inclined. The idler frame 76 with its roll 78 is centrally attached to the gudgeon 74 for swinging movement about the inclined axis of this gudgeon. The idler frame 76 and its roll, therefore, will move through an arcuate path or a plane which is inclined and which intersects the gudgeon between its ends. As the roll 78 is located above the gudgeon and is attached to the latter at a point intermediate its ends, any load applied to the roll 78 will be delivered radially to the bearing cups 72 and the bearing brackets 75. The laterally offset arrangement of the roll shaft 79 with respect to the gudgeon will cause the roll to partake of a caster movement with respect to the axis of the gudgeon.

When a belt riding on the roll 78 becomes misaligned, the roll and its frame will become unbalanced and one side of the roll and frame will dip downwardly and forwardly while the remaining side of the roll and frame will move upwardly and rearwardly. This swiveling movement of the roll will re-train the belt into its normal transverse position.

It has been determined that the center roll of a self-aligning troughing idler is the only one which tends to train the belt. In view of this fact, a greater training action may be obtained for a troughed belt by employing a flat roll type of self-aligning idler which is employed solely for training purposes and is located between two fixed troughing idlers. This greater training action is due to the fact that there is obtained a greater length of contact between the belt and the flat roll of the self-aligning idler than is obtained between the belt and the center roll of a self-aligning troughing idler. A further advantage from the use of this type of self-aligning idler is that a flat roll self-aligning idler is less expensive to manufacture than a troughed roll self-aligning idler. Ordinarily, self-aligning idlers are used to replace one of the regular carrying units so that they serve the double purpose of training the belt and supporting it. When the flat roll self-aligning idler is used with troughed belts, it will not replace any of the regular carrying units, but will be placed between two regularly spaced, fixed idlers. Thus, its primary purpose will be to train the belt and its function of supporting the belt will be secondary.

Fig. 15 illustrates this principle of employing a flat self-aligning idler roll to train a troughed belt. In this figure, there are disclosed two regularly spaced, fixed troughing idlers 80 which have their frames 81 suitably secured to the stringers 82. The belt 83 is supported and troughed by the angularly arranged rolls 84 of these two idlers. Interposed between the two fixed idlers 84 is a self-aligning idler 85. As is best shown in Fig. 13, this self-aligning idler 85 is provided with a single, flat roll 86 which is supported for rotation in the upstanding bracket arm 87 of an idler frame 88. The conveyer belt 83 will travel with its flat central portion 83a bearing upon the periphery of the flat roll 86 of this idler. Naturally, as this roll 86 is not shaped to sustain the side portions of the belt in their troughed or angular relation with respect to the center portion, the belt will have a tendency to flatten out and thereby increase the length of contact or the width of the flat center portion 83a. This difference in contact area or length is illustrated in Fig. 15.

Figs. 13 and 14 illustrate the idler frame as being mounted for pivotal movement about an axis which is inclined to the plane of travel of the conveyer belt 83. A suitable swivel structure 89, the details of which are not illustrated, mounts the idler frame on the channel base 90 which is mounted at its opposite ends on the stringers 82 by means of the brackets 91. The details of the swivel mounting 89 may take the form of the gudgeon type mounting disclosed in either of Figs. 3 or 6.

When the conveyer belt 83 moves out of alignment relative to the self-aligning idler unit 85, the weight of the belt will place the idler 85 in an unbalanced condition which will cause the end of the idler roll 86 and its frame on the heavy side to move downwardly and forwardly. The other side of the roll 86 and its idler frame will move upwardly and rearwardly. This swiveling of the idler roll will cause the conveyer belt to be trained back to its intended location. The realigned belt will again balance the idler 85 and return its roll and frame to the normal position wherein the axis of the roll extends truly horizontally.

Considering the five different forms of self-aligning idlers, it will be seen that each one possesses an idler frame which carries one or more idler rolls with the frame and rolls partaking of pivotal movement about the axis of a gudgeon which is inclined at an angle occurring between the perpendicular and the horizontal. As has been stated, this angle of inclination should be from 20° to 50° for obtaining the best results. The devices employed for connecting the idler roll or rolls to the gudgeon are so constructed and arranged in each idler structure as to position the rolls, or at least their axes, laterally of any vertical plane passing through the supporting base and laterally of the axis of rotation of the supporting gudgeon. The rolls, therefore, partake of the movement of a caster wheel about the gudgeon axis. This caster movement is modified by the inclination of the gudgeon axis so that pivotal movement of the idler frame and its roll or rolls causes one side of the movable elements to dip downwardly and forwardly with respect to the direction of travel of the conveyer belt, which direction is indicated by arrows in the several figures, while the remaining side of the movable structure moves upwardly and rearwardly. Although plain bearings, gudgeons and thrust buttons have been shown for the various pivotal points, it will be understood that anti-friction and other types of bearings can be employed without modifying the invention.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A self-aligning idler for belt conveyers comprising a stationary support, a swivel structure mounted on said support with its single axis of rotation inclined to the path of travel of the belt and leaning toward the direction of departure of the belt, an idler frame, one or more idler rolls carried by the frame, and means for mounting the idler frame on said swivel structure for movement about said swivel axis with the axis or axes of the roll or rolls and the idler frame being arranged to lie on the belt departure side of said swivel axis, thereby causing the entire idler frame and roll axis or axes to swing bodily about the swivel axis and one side of the frame to move downwardly and forwardly while the other side moves upwardly and rearwardly with respect to the direction of travel of the belt.

2. A self-aligning idler for belt conveyers comprising a stationary support, a bearing mounted on said support with its single axis of rotation inclined to the path of travel of the belt and leaning toward the direction of departure of the belt, an idler frame, one or more idler rolls carried by the frame with the axis or axes of the roll or rolls lying in a plane which longitudinally intersects the idler frame, and means for centrally mounting the idler frame on the bearing for movement about the bearing axis with the axis or axes of the roll or rolls and the idler frame being arranged to lie on the belt departure side of said bearing axis and with the said bearing axis being angularly arranged with respect to and intersecting the aforesaid longitudinal plane of the idler frame, thereby causing the entire idler frame and roll axis or axes to swing bodily about the bearing axis and one side of the frame to move downwardly and forwardly while the other side moves upwardly and rearwardly with respect to the direction of travel of the belt.

3. An automatically operating self-aligning idler for belt conveyers comprising a stationary support, an idler frame, one or more idler rolls carried by the frame for supporting a belt, and means for movably mounting the idler frame on said support so constructed and arranged as to cause the frame and its roll or rolls to be arranged at right angles to the length of the belt when the weight of the belt and its conveyed load is balanced lengthwise of the idler frame and to cause the entire frame and its roll or rolls to freely partake of off center arcuate movements about an axis which is inclined to the plane of and in the direction of travel of the belt and is offset laterally of and on the belt approaching side of the axes of the rolls and the center of mass of the idler roll assembly when the weight of the belt is unbalanced lengthwise of said frame.

4. An automatically operating self-aligning idler for belt conveyers comprising a stationary support, an idler frame, one or more idler rolls carried by the frame for supporting a belt, and means for movably mounting the idler frame on said support so constructed and arranged as to cause the frame and its roll or rolls to be arranged at right angles to the length of the belt when the weight of the belt and its conveyed load is balanced lengthwise of the idler frame and to cause the entire frame and its roll or rolls to freely partake of off center arcuate movement about an axis which is inclined to the plane of and in the direction of travel of the belt and is offset laterally of and on the belt approaching side of the axes of the rolls and the center of mass of the idler assembly when the weight of the belt is unbalanced lengthwise of said frame and with the frame dipping downwardly and forwardly of the direction of travel of the belt on the heavier side.

5. An automatically operating self-aligning idler for belt conveyers comprising a stationary support, an idler frame, one or more idler rolls carried by the frame for supporting a belt, and means for movably mounting the idler frame on said support so constructed and arranged as to cause the frame and its roll or rolls to be arranged at right angles to the length of the belt when the weight of the belt and its load is balanced lengthwise of the idler frame and to cause the shaft of each roll to freely swing bodily in a plane inclined to the plane of travel of the belt and about an axis which is laterally offset relative to and on the belt approaching side of the roll axes and the center of mass of the idler roll assembly when the weight of the belt and its load is unbalanced with respect to the idlers.

6. A self-aligning idler for belt conveyers comprising a channel base, a swivel housing mounted on the base, swivel means partially received in the bore of the housing with its axis of pivotal movement inclined to the plane of travel of the belt, a swivel apron mounted on the unhoused portion of the swivel means, an idler frame attached to the swivel apron, and a roll supported for rotation on said frame with its axis offset relative to and on the belt departing side of the swivel means axis.

7. A self-aligning idler for belt conveyers comprising a channel base, a swivel housing mounted on the base, swivel means supported by the housing to partially project therefrom with its axis of pivotal movement inclined to the plane of travel of the belt, a swivel apron mounted on the projecting portion of the swivel means, an idler frame, means carried by the swivel apron for detachably clamping the idler frame in a position to one side of the axis of the swivel means, and a plurality of rolls arranged to trough a belt supported for rotation on said frame.

8. A self-aligning idler for belt conveyers comprising a channel base, a swivel housing mounted on the base, swivel means supported by the housing with its axis of pivotal movement inclined to the plane of travel of the belt, a swivel apron mounted on the swivel means, a T shaped idler frame, a pair of arms projecting laterally from the swivel apron and having seats to receive two of the edges of the frame, a lug to engage the remaining edge of the frame, means for drawing the lug toward one of said arms to clamp the frame, and a plurality of troughing rolls rotatably supported by the frame.

9. A self-aligning idler for belt conveyers comprising a channel base, a swivel housing mounted on the base, swivel means supported by the housing with its axis of pivotal movement inclined to the plane of travel of the belt, a swivel apron mounted on the swivel means, an idler frame, one or more idler rolls rotatably supported on the frame, and laterally projecting arms having means for centrally detachably clamping the frame to the swivel apron so that the frame and its roll or rolls will swing about the said inclined axis.

10. In a belt conveyer, a main conveyer frame, a pair of fixed idlers mounted on said frame in normal spaced relation and each having a plurality of rolls angularly arranged to trough a belt, and a self-aligning idler mounted on the conveyer frame intermediate the fixed idlers, said self-aligning idler having a single, flat roll of a length substantially equal to the width of the belt, and means for supporting said flat roll for rotary movement about its own axis and for pivotal movement about an axis inclined to the plane of travel of the belt.

11. A self-aligning idler for belt conveyers comprising an idler frame, a plurality of belt supporting idler rolls carried by the frame with the axes of all of said rolls lying in the central plane of the idler frame, and means for supporting said idler frame so that its central plane normally will be arranged truly vertically and so that the idler frame and rolls may partake of pivotal movement about an axis which is inclined to the vertical.

12. A self-aligning idler for belt conveyers comprising an idler frame, a plurality of belt supporting idler rolls angularly carried by the frame so as to trough a belt and with the axes of all of said rolls lying in the central plane of the idler frame, and means for supporting said idler frame so that its central plane normally will be arranged truly vertically and so that the idler frame and rolls may partake of pivotal movement about an axis which is centrally positioned with respect to the length of the idler frame, which is inclined to the vertical, and which will intersect some part of the idler frame and roll assembly.

13. A self-aligning idler for belt conveyers comprising an idler frame, a belt supporting idler roll carried by the frame with the axis of the roll lying in the central plane of the idler frame, and means for supporting said idler frame so that its central plane normally will be arranged truly vertically and so that the idler frame and roll may partake of pivotal movement about an axis which is inclined to the vertical and which intersects said central plane on the belt approaching side of the roll axis.

14. A self-aligning idler for belt conveyers comprising a stationary support, a swivel structure mounted on said support with its single axis of rotation inclined to the path of travel of the belt and leaning toward the direction of departure of the belt, an idler frame, one or more idler rolls carried by the frame with the axis or axes of the roll or rolls lying in the central plane of the idler frame, and means for mounting the idler frame on said swivel structure so that its central plane normally will be arranged truly vertically and for movement about said swivel axis with the axis or axes of the roll or rolls and the idler frame being arranged to lie on the belt departure side of said swivel axis, thereby causing the entire idler frame and roll axis or axes to swing bodily about the swivel axis and one side of the frame to move downwardly and forwardly while the other side moves upwardly and rearwardly with respect to the direction of travel of the belt.

15. An automatically operated self-aligning idler for belt conveyers comprising a stationary support, an idler frame, means for mounting the idler frame on the stationary support for free bodily movement about a single axis which is inclined to the plane of travel of the belt, and an idler roll carried by the idler frame with its axis of rotation at right angles and in offset relation to and on the belt departure side of the aforesaid inclined axis of movement of the idler frame.

RICHARD W. PARKER.